UNITED STATES PATENT OFFICE.

JOSEPH SAVELSBERG, OF PAPENBURG, GERMANY.

PROCESS OF EXTRACTING THE HEAVY METALS BY THE USE OF CHLORIN.

SPECIFICATION forming part of Letters Patent No. 741,840, dated October 20, 1903.

Application filed March 30, 1903. Serial No. 150,327. (No specimens.)

*To all whom it may concern:*

Be it known that I, JOSEPH SAVELSBERG, doctor of philosophy, a subject of the King of Prussia, German Emperor, residing at Papenburg, in the Kingdom of Prussia, Germany, have invented certain new and useful Improvements in Processes of Extracting the Heavy Metals by the Use of Chlorin; and I do hereby declare the following to be a full, clear, and exact description of the invention, such as will enable others skilled in the art to which it appertains to make and use the same.

The herein-described invention relates to a process for handling sulfur-bearing ores, mattes, or mining products by means of chlorin assisted by a solvent.

The extraction of the metals from sulfur-bearing ores by means of chlorin in the presence of iron chlorid is already well known; but this process has the double disadvantage that a large portion of the chlorin which serves to dissolve the metallic sulfids is not used and a cycle process cannot be employed. In the herein-described process it is possible to do away with this double disadvantage and not only to utilize nearly all the chlorin for dissolving the metals, but to also reavail oneself of nearly all of it. This is effected by using instead of iron chlorid iron oxid, the ore or other raw material being suspended in water or, better yet, in a salt solution, as sodium chlorid, calcium chlorid, or magnesium chlorid. The oxidation of the sulfur by means of the chlorin produces sulfuric acid, which in the presence of the alkaline-metal chlorid combines with the metallic radical to form an alkaline sulfate, thereby binding the sulfuric acid and liberating chlorin in the form of hydrochloric acid. The action of the chlorin on the mass—as, for instance, a sulfur-nickel compound (nickel-matte) in a lye of calcium chlorid—takes place for the most according to the following equation:

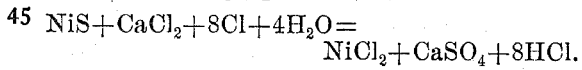

$$NiS+CaCl_2+8Cl+4H_2O = NiCl_2+CaSO_4+8HCl.$$

The hydrochloric acid thus formed is neutralized by adding iron oxid, so that a neutral solution is obtained containing $NiCl_2$ and $Fe_2Cl_6$. Air is now blown through the solution in the presence of more raw material, (nickel-matte,) whereby the ferric chlorid ($Fe_2Cl_6$) will be reduced by the matte to ferrous chlorid, ($FeCl_2$,) thereby forming more nickel chlorid, and this ferrous chlorid will be oxidized by the air into ferric oxid, ($Fe_2O_3$,) the reactions taking place as follows:

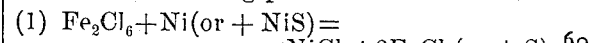

(1) $Fe_2Cl_6+Ni(or + NiS) =$
$$NiCl_2+2FeCl_2(or + S)$$

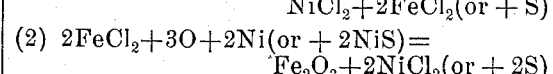

(2) $2FeCl_2+3O+2Ni(or + 2NiS) =$
$$Fe_2O_3+2NiCl_2(or + 2S)$$

The solution is now separated from the residues and electrolyzed to obtain metallic nickel and chlorin gas, the latter being returned into the cycle of operations to be reused. The residues, containing oxid of iron and some undissolved raw material, (matte,) are now treated, as above described, with chlorin as an alkaline-metal chlorid lye.

The process may be further described in its application to nickel combinations. The finely-powdered nickel-matte and the iron oxid which is especially introduced for this process are suspended in an apparatus adapted to the purpose in a lye of calcium chlorid and suitably, as by stirring, held in suspension in the latter. This lye is then subjected to the action of gaseous chlorin, which converts the nickel and the iron of the matte into chlorids that are soluble in the lye and sets their sulfur free therefrom. The sulfur in the reaction is oxidized by the action of chlorin in the presence of the water in the lye into sulfuric acid, the chlorin entering into combination with hydrogen as hydrochloric acid. By means of the calcium chlorid contained in the lyes (or in case the ore is suspended in water only by addition of caustic lime or of calcium carbonate) the sulfuric acid is removed as calcium sulfate or so-called "gypsum." The hydrochloric acid formed by the chlorin converts the iron oxid which is suspended in the lye into ferric chlorid, which in turn reacts with the nickel-matte to form ferrous chlorid and nickel chlorid. When the solution of the nickel and the iron is complete, the lye is separated from the calcium sulfate. silicic acid, and other insoluble components of the matte by filtration. The filtrate, which contains nickel and some iron in the form of ferrous and ferric chlorid, is then treated in suitable receptacles with fresh finely-pulverized matte, the latter being kept in suspension in the liquid, and air is blown through this "slip" or emulsion. This frees the chlorin which is combined with the iron by converting the iron into iron oxid and dissolves from the nickel-matte a corresponding quantity of nickel, the iron being precipitated as hydrated iron oxid. This process can be facilitated or accelerated by warming the liquids to 60° or 70° centigrade, but also takes place at ordinary temperatures. The iron oxid remains a long time suspended in the liquid, while the heavy matte residue rapidly sinks to the bottom. By decanting, the greater portion of the iron oxid can be separated from the matte. The pure-nickel lye filtered free from the iron oxid is subjected to electrolysis, and the chlorin thus set free serves again for treating the mixture of nickel-matte and iron oxid resulting from the precipitation of the iron, as above described. If silver and gold be present in the matte, the silver is converted into chlorid and as such is dissolved in the solution, while gold remains in the residue, from which it may be extracted in any known manner. The ferric oxid obtained can be removed and used as a pigment or as a constituent of pigments.

Having thus described my invention, what I claim as new therein, and desire to secure by Letters Patent, is—

1. The process of obtaining metals from their sulfur combinations in ores, mattes and the like, which consists in suspending the material in water, subjecting the solution to the action of chlorin in the presence of iron oxid, then treating the solution so obtained with air in the presence of more material, separating the solution from the insoluble contents and recovering the metal therefrom, substantially as described.

2. The process of obtaining metals from their sulfur combinations in ores, mattes and the like, which consists in suspending the material in water, subjecting the solution to the action of chlorin in the presence of iron oxid, then blowing air through the solution in the presence of more material to convert ferrous chlorid into ferric oxid, separating the solution from its insoluble contents, electrolyzing the solution to obtain metal and chlorin gas and returning the chlorin for the treatment of further quantities of material.

3. The process of obtaining metals from their sulfur combinations in ores, mattes and the like, which consists in suspending the material in water, adding thereto an alkaline-metal chlorid and iron oxid, introducing into the solution chlorin, then introducing air into the solution in the presence of more raw material, separating the solution from residues, electrolyzing the solution to obtain metal and chlorin gas, and returning the chlorin gas for the treatment of further materials, substantially as described.

4. The process of obtaining metals from their sulfur combinations in ores, mattes and the like, which consists in suspending the material in water, adding thereto iron oxid and a salt capable of reacting with sulfuric acid to bind the sulfuric acid formed during the process, then introducing chlorin gas into the solution, blowing air through the solution in presence of more material, separating the solution from the precipitates and residues, electrolyzing the solution to obtain metal and chlorin and returning the chlorin for the treatment of further quantities of material, substantially as described.

5. The process of obtaining metals from their sulfur combinations in ores, mattes and the like, which consists in suspending the material in a solution of calcium chlorid containing oxid of iron in suspension, passing chlorin into the solution, blowing air through the solution in the presence of more material, precipitating the material not acted upon by acid, decanting the liquid containing hydrated iron oxid, filtering the solution, electrolyzing it to obtain metal and chlorin and returning the chlorin for the treatment of more material, substantially as described.

In testimony that I claim the foregoing as my invention I have signed my name in presence of two subscribing witnesses.

JOSEPH SAVELSBERG.

Witnesses:
 HENRY RUSIDFLIEG,
 PAUL GOOSSENS.